(12) United States Patent
Harter et al.

(10) Patent No.: US 8,439,238 B1
(45) Date of Patent: May 14, 2013

(54) ACCESSORY HOLDER SYSTEM FOR MOUNTING TO A GOLF BALL HOLDER IN A GOLF CART

(76) Inventors: Terrance Lee Harter, Canyon Lak, TX (US); Ronald Scott Harter, Austin, TX (US)

( * ) Notice: Subject to any disclaimer, the term of this patent is extended or adjusted under 35 U.S.C. 154(b) by 0 days.

(21) Appl. No.: 13/292,118

(22) Filed: Nov. 9, 2011

(51) Int. Cl.
*B60R 7/04* (2006.01)
*B60R 11/00* (2006.01)

(52) U.S. Cl.
USPC ............ 224/274; 224/544; 224/556; 224/929

(58) Field of Classification Search ................... 224/274, 224/483, 544, 553, 548, 555, 556, 918, 919, 224/929; 248/220.41, 220.42, 222.51, 222.52, 248/311.2
See application file for complete search history.

(56) References Cited

U.S. PATENT DOCUMENTS

| | | | | |
|---|---|---|---|---|
| 4,724,986 A * | 2/1988 | Kahn | ............................ | 224/544 |
| 5,086,958 A * | 2/1992 | Nagy | ............................ | 224/544 |
| 5,979,724 A * | 11/1999 | Loewenthal et al. | ......... | 224/483 |
| 6,062,518 A * | 5/2000 | Etue | .......................... | 248/231.21 |
| 7,597,301 B2 * | 10/2009 | Seil et al. | .................... | 248/311.2 |
| 2004/0182897 A1* | 9/2004 | Andrews et al. | .............. | 224/274 |
| 2011/0036881 A1* | 2/2011 | Higgs | ........................... | 224/274 |

* cited by examiner

*Primary Examiner* — Justin Larson
*Assistant Examiner* — Corey Skurdal

(57) ABSTRACT

An accessory holder system for securing a Personal Electronic Device (PED) for use in a golf cart whereby a golfer can easily view golf course GPS information on a display. The system includes a mount for insertion into a golf ball holder disposed in a golf cart; and an accessory holder for attachment and adjustment of the viewing angle of a PED in a variety of golf cart configurations. The accessory holder is typically composed of a mount with an attached rod for displacing an accessory away from interference with the golf cart dash board; a ball joint with a tensioning cap attached to the rod for adjusting the viewing position of an accessory; with a platform for mounting an accessory attached to the other end of the rod. The mount includes surface features which provide rotational stability for an accessory holder without relying on a friction-fit.

4 Claims, 7 Drawing Sheets

FIG. 5
FIG. 6
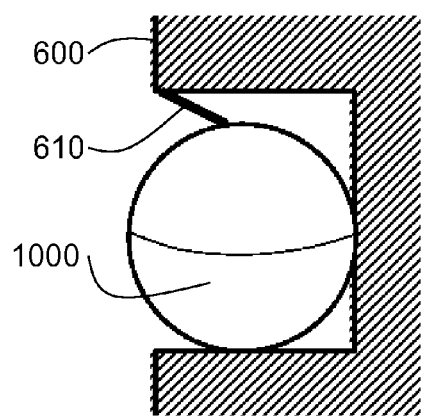
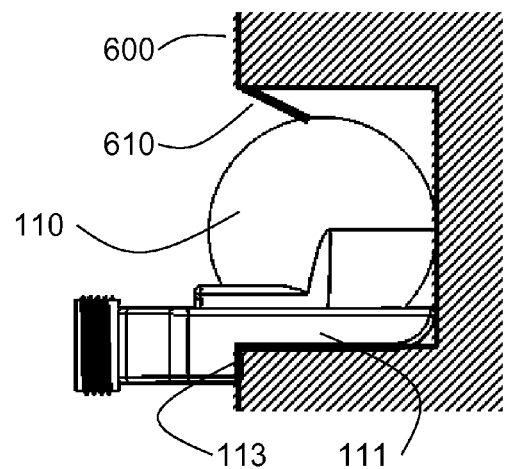
FIG. 7
FIG. 8
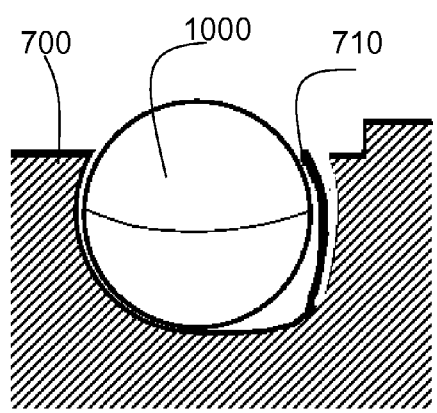
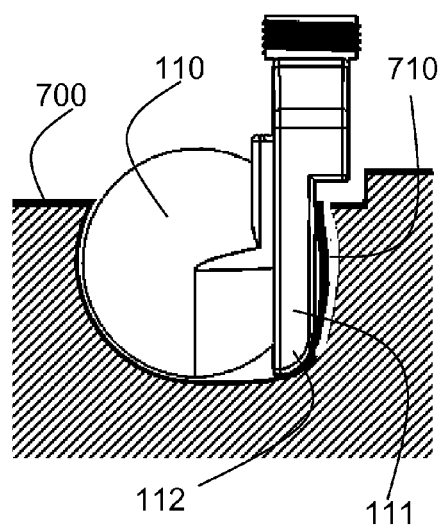

ACCESSORY HOLDER SYSTEM FOR MOUNTING TO A GOLF BALL HOLDER IN A GOLF CART

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This application relates to accessory holders for holding personal electronics and other articles, specifically to accessory holders that mount to a golf ball holder in a golf cart.

2. Prior Art

Accessory holders for holding personal electronics and/or other articles in golf carts are known. Accessory holders used in golf carts include clamp-type mounts, suction cup mounts, and cup holder mounts. Bag-type mounts which are used in other types of vehicles are typically not used in golf carts due to their dynamic motion. Clamp-type mounts use clamps to attach to some part of the golf cart structure, e.g., struts holding the windshield or to the dash board. Suction cup mounts use suction cups to attach accessory holders to a windshield or a portion of a dash board which is large enough and smooth enough to allow a suction cup to seal. Cup holder mounts insert into and engage the inner surface of beverage cup holders.

Clamp-type mounts are more suited to permanent attachment. Many golfers rent carts and must attach and remove the mount. In either case a clamp, when attached to the windshield strut, can impede adjustment of a golf cart windshield. Some clamps can be bulky, making them difficult to store in a golf bag along with all of the other equipment that a golfer has stored.

Suction cup mounts may be adversely influenced by temperature and humidity fluctuations. The dynamic motion of a golf cart may also result in a bending moment applied to a suction cup by the weight of the accessory device, resulting in release of the device. Aging and repeated use of a suction cup may result in reduced reliability of the suction produced, resulting in release of the device and potential damage to an attached accessory device.

Cup holder mounts take up one of the beverage holders in a golf cart, reducing the number available for beverages and other items. The arm and attached accessory device may also impede access to beverages in the other beverage holders. A cup holder mount is also bulky, making it difficult to store in a golf bag along with all of the other equipment that a golfer has stored.

SUMMARY

Modern golfers have access to a variety of Personal Electronic Devices (PED's) which provide GPS location information relative to golf course features such as greens and various hazards. The invention described herein is an accessory holder system for securing a PED and making information available for use in a golf cart whereby a golfer can easily view information from a PED display. The accessory holder system includes a mount/base assembly for insertion into a golf ball holder disposed in a golf cart; and an accessory holder for attachment and adjustment of the viewing angle of a PED in a variety of golf cart configurations such that GPS golf course distance information can easily be seen and used by a golfer. A golf ball holder is generally located in or below the dash board of the golf cart, configured with a spherical of cylindrical cavity which accepts a golf ball and having an internal structure to frictionally hold a golf ball in place. The accessory holder is typically composed of an attached rod for displacing an accessory away from interference from the golf cart dash board; a ball joint with a tensioning cap attached to the rod for adjusting the viewing position of an accessory; with a platform for mounting an accessory attached to the other end of the rod. Typically the mount is a base assembly composed of a truncated sphere the diameter of a golf ball attached to a base structure with surface features/shapes which provide rotational stability for an accessory holder without relying on a friction-fit when inserted into a variety of golf ball holders disposed in golf carts and maintains an accessory in a substantially stable and constant position during use.

DRAWINGS

Figures

The figures are consecutively numbered.

FIG. 5 shows a section view of a Type I Golf Ball Holder with a golf ball

FIG. 6 shows a section view of a Type I Golf Ball Holder with a Base Assembly

FIG. 7 shows a section view of a Type II Golf Ball Holder with a golf ball

FIG. 8 shows a section view of a Type II Golf Ball Holder with a Base Assembly

REFERENCE NUMERALS

Figure 1:
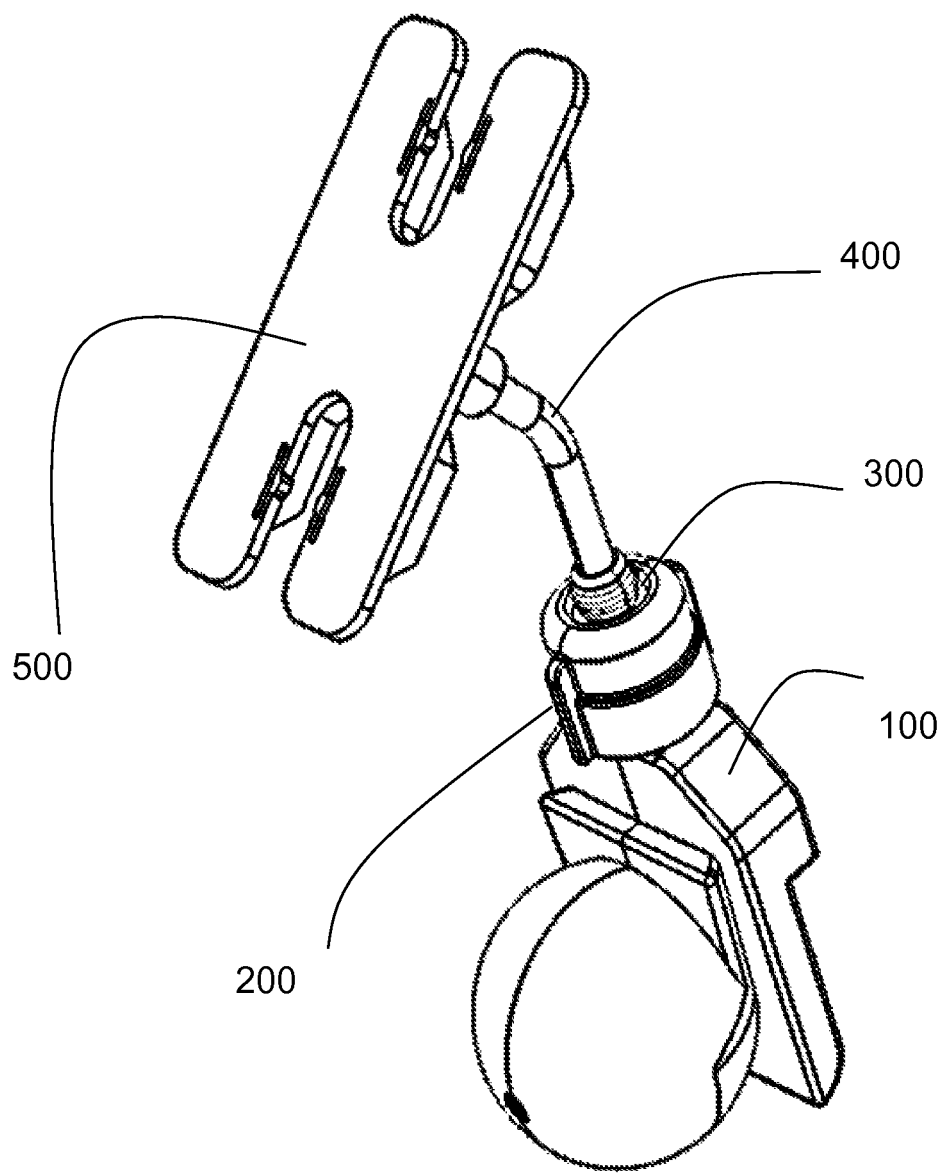
FIG. 1 shows one embodiment of an accessory holder system

100 Mount/Base Assembly (BA)
110 BA—truncated sphere with the radius of a golf ball attached to a base structure 111 BA—base structure
112 BA—curved back to base structure with same radius as sphere
113 BA—shelf on bottom surface of base structure
114 BA—rail on top surface of base structure
115 BA—interface for attaching a rod to a base structure
200 Cap for securing a flexible ball joint to base assembly
300 Ball attached to rod and secured to base assembly by cap
400 Rod for displacing an accessory device from base assembly
500 Platform attached to a rod and for mounting an accessory device
600 Type I golf ball holder
610 Part of Type I golf ball holder—tension device
700 Type II golf ball holder
710 Part of Type II golf ball holder—tension device
800 Type III golf ball holder
810 Part of Type III golf ball holder—open slot
910 Alternate BA—jaw
920 Alternate BA—lever
930 Alternate BA—screw drive
1000 Golf ball

DETAILED DESCRIPTION

FIGS. 1-4

First Embodiment

Figure 2:
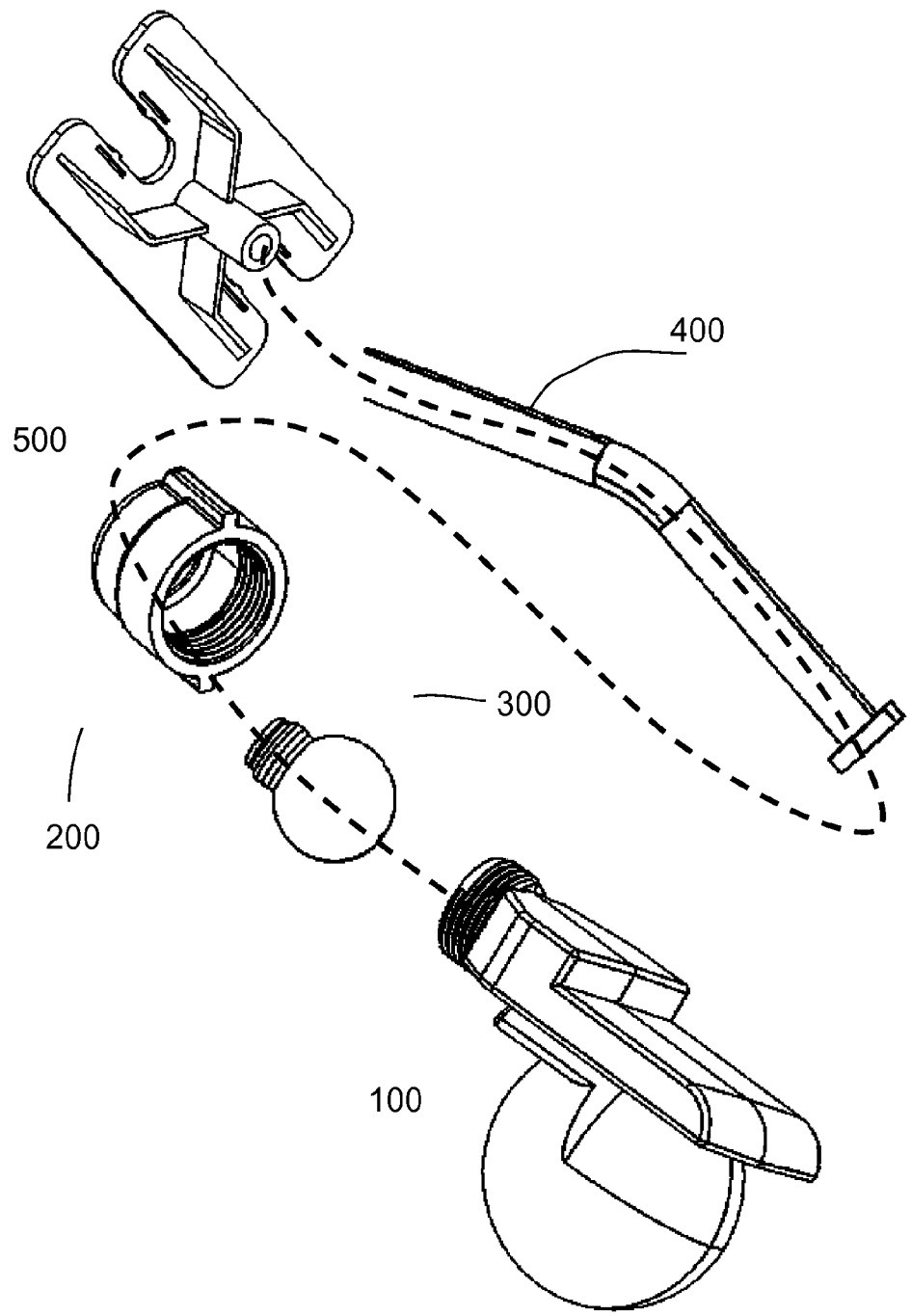
FIG. 2 shows the same embodiment in an exploded view

One embodiment of an accessory holder system is illustrated in FIG. 1, with an exploded view illustrated in FIG. 2. An accessory holder system uses a platform 500 for mounting a personal electronic device (PED) or other item. The platform is manufactured using an injection molding process with a plastic/resin material. This embodiment has a slot cut in either end of the platform 500 to accept a button on a PED. A belt clip can also be used to attach a PED. Two slots are used to accommodate installation of the system in either a vertical or horizontal orientation. The back surface of the platform 500 has a receptacle for insertion of a rod 400. An adapter can be used with the platform to accommodate a variety of PEDs or other items. In this embodiment, the platform 500 is primarily rectangular. Other embodiments can use different configurations of the platform 500.

A rod 400 is used to displace a PED from a mount/base assembly (BA). In this embodiment a solid material is used. The rod 400 has a bend in it to aid in positioning a PED for improved PED viewing angles. A flange on the end of the rod 400 is engaged by a cap 200 for securing the rod 400 in a desired position for viewing a PED. The rod 400 can be manufactured from metal such as stainless steel or a plastic material. Other embodiments can use a flexible goose-neck type rod 400 instead of solid material.

In this embodiment, a ball joint is used to provide the capability for adjusting the position for viewing a PED. A ball 300 is attached to the rod 400 for this purpose. A mount is composed of a base assembly 100 with a receptacle to accommodate the ball 300 with a thread for the cap 200. The cap 200 is tightened to fix the rod 400 in a desired position. The ball 300 and cap 200 are manufactured using an injection molding process with a plastic/resin material. Other embodiments may attach a flexible goose neck rod 400 directly to the base assembly 100 without use of a ball joint. A goose neck rod 400 can be bent for positioning a PED for viewing.

Figure 3:
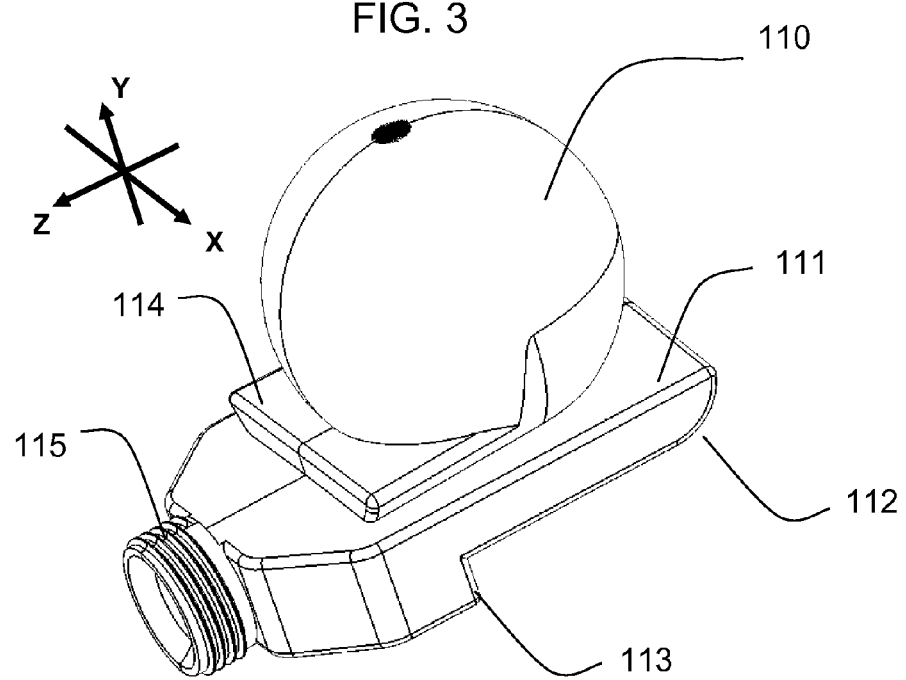
FIG. 3 shows a perspective view of a Base Assembly (Left-Top View)
Figure 4:
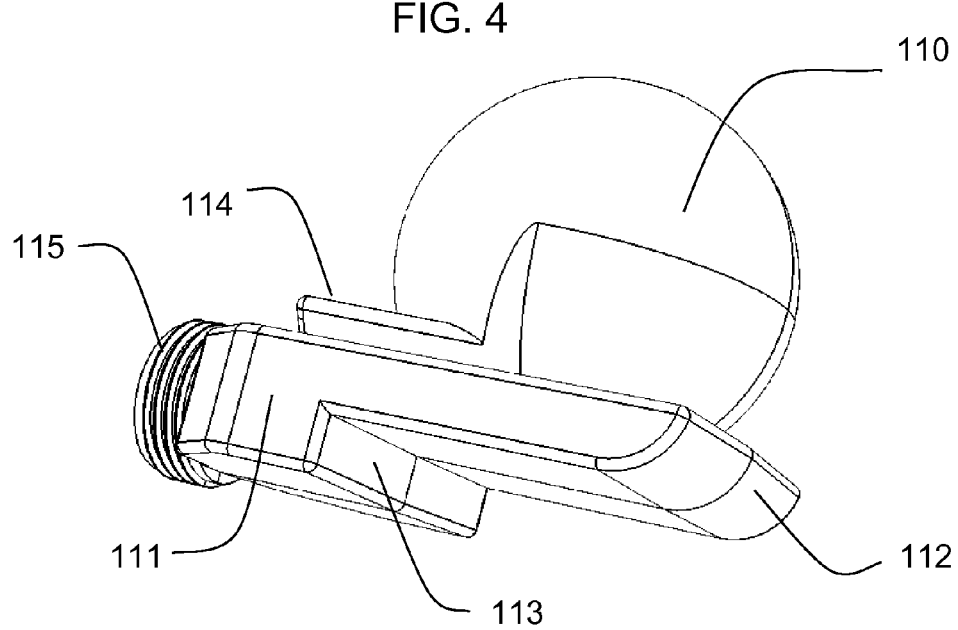
FIG. 4 shows a perspective view of a Base Assembly (Right-Bottom View)

FIG. 3 and FIG. 4 illustrate features of this embodiment of the mount as a base assembly (BA) 100. This is a key item for interfacing with a golf ball holder in a golf cart. Several features are designed to provide rotational stability in a variety of golf ball holders disposed in golf carts. Golf ball holders disposed in golf carts are well known in the golf industry. They are generally located in or below the dash board of a golf cart, and are configured with a cavity composed of a cylindrical or spherical section. The cavity accepts a standard golf ball (a sphere with a diameter not less than 1.680 inches per the United States Golf Association rules), and has an internal configuration to hold a golf ball in place. A truncated sphere 110 is on the top surface of a base structure 111. It has the approximate diameter of a golf ball, with a portion of the sphere removed. The rear portion of the base structure 111 is a depth equal to that portion removed from the sphere; with a shelf/ledge 113 which increases the depth of the base structure 111 at the front. The back end of the base structure 111 is curved 112 with the same radius as the truncated sphere 110. A rail 114 is attached to the top surface of the base structure 111 in front of the truncated sphere 110, and is the same width as the truncated sphere where it meets the base structure 111. These features provide rotational stability in a variety of golf cart/golf ball holder configurations. The front of the base structure 111 has a hollow, threaded interface 115 for attaching the ball 300 and rod 400 to the base assembly 100. The base assembly 100 is composed of a left and right side, each of which is mostly hollow with internal support struts. The two sides are manufactured using an injection molding process with a plastic/resin material. The center line dividing the two halves can be seen in FIG. 3 and FIG. 4.

Operation—FIGS. 5-12

For the purpose of this description, three types of golf ball holders are described along with their operation for retaining a golf ball and a mount/base assembly of the accessory holder system. These golf ball holders are arbitrarily referred to as Type I, II and III. They are not part of the invention described in this application.

FIGS. 5 & 6 represents a section view of a Type I Golf Ball Holder 600. FIG. 5 depicts a golf ball 1000 in the golf ball holder 600 and FIG. 6 depicts a mount/base assembly 100 of the first embodiment in the golf ball holder 600. This type of golf ball holder is installed in some models of the E-Z-GO golf cart, in a vertical part of the dash board. As illustrated in FIG. 5, when the golf ball 1000 is inserted into the golf ball holder 600, a tension tab 610 which is part of the golf ball holder 600 presses against the golf ball 1000 to hold it in place. Since the golf ball 1000 is a sphere, the tension tab 610 only makes contact at one point on the ball. This keeps the ball in the holder; however it provides very little lateral/yaw stability.

A xyz coordinate frame orientation with respect to the mount/base assembly is depicted in FIG. 3. Pitch is a rotation about the x-axis, roll is a rotation about the z-axis, and yaw is a rotation about the y-axis. These terms will be used to describe stability of the mount/base assembly 100 when inserted into a golf ball holder.

As illustrated in FIG. 6, when the mount/base assembly (BA) 100 of the first embodiment is inserted into the golf ball holder 600, the tension tab 610 presses against the BA truncated sphere 110, and holds it in place in the same manner as a golf ball. The bottom, back portion of the BA base structure 111 is flat and rests on the bottom of the ball holder structure, providing lateral/yaw and roll stability. The shelf on the bottom of the BA 113 rests against the front of the golf ball holder 600, providing lateral/yaw and pitch stability. In this type of golf ball holder, the BA is in a horizontal position. The accessory holder system rod 400 and accessory platform 500 depicted in FIG. 1A are rotated to position a PED at a suitable viewing angle for a golfer and fixed in position by tightening the ball cap 200. Other embodiments may use a flexible goose neck rod which can be bent into a desired position.

FIGS. 7 & 8 represent a section view of a Type II Golf Ball Holder 700. FIG. 7 depicts the golf ball 1000 in the golf ball holder 700 and FIG. 8 depicts the mount/base assembly 100 of the first embodiment in the golf ball holder 700. Variations of this type of golf ball holder are installed in some models of the Yamaha and Club Car golf carts, in a horizontal part of the dash board or in a tray mounted under the dash board. As illustrated in FIG. 7, when the golf ball 1000 is inserted into the golf ball holder 700, the equator of a golf ball is below a curved portion of the front of the golf ball holder and held in place with a tension tab 710 in the back, which is part of the golf ball holder 700. These features of the golf ball holder keep the golf ball in place, however, do not provide much rotational stability in roll, pitch or yaw.

As illustrated in FIG. 8, when the mount/base assembly (BA) 100 of the first embodiment is inserted into the golf ball holder 700, the equator of the BA truncated sphere 110 rests below the front curve of the golf ball holder 700, and the tension tab 710 presses against the bottom back section of the base assembly 111. The curved back 112 of the base assembly 111 matches the curvature of the bottom of the golf ball holder. Since the back bottom of the base assembly 111 is flat, the tension tab 710 presses against a large surface area and provides greater pitch and roll stability. The width of the back of the base assembly 111 is straight and rests against the bottom of the golf ball holder 700, providing yaw stability. In this type of golf ball holder, the BA is in a vertical position. The accessory holder system rod 400 and accessory platform 500 depicted in FIG. 1 are rotated to position a PED at a suitable viewing angle for a golfer and fixed in position by tightening the ball cap 200. Other embodiments may use a flexible goose neck rod which can be bent into a desired position.

Figure 9:
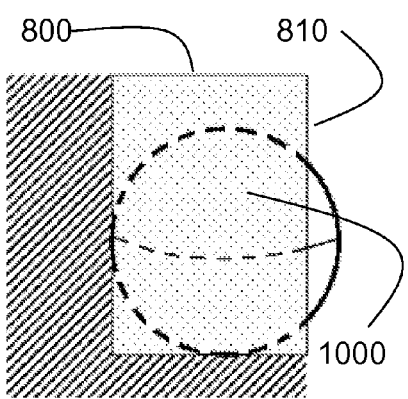
FIG. 9 shows a section view of a Type III Golf Ball Holder with a golf ball (side)
Figure 10:
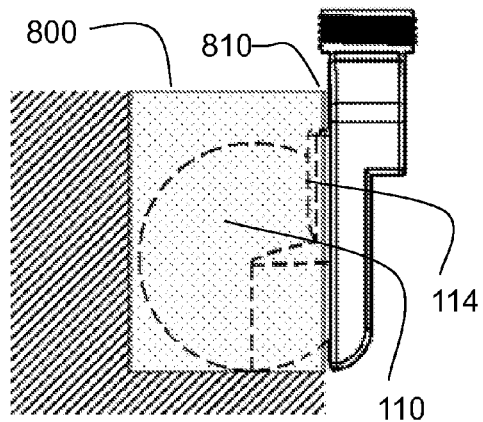
FIG. 10 shows a section view of a Type III Golf Ball Holder with a Base Assembly (side)
Figure 11:
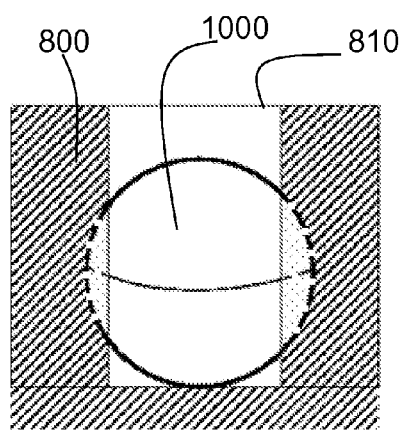
FIG. 11 shows a section view of a Type III Golf Ball Holder with a golf ball (front)
Figure 12:
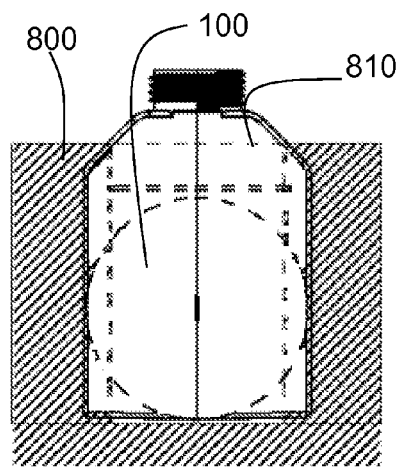
FIG. 12 shows a section view of a Type III Golf Ball Holder with a Base Assembly (front)

FIG. 9-12 represent a section view of a Type III Golf Ball Holder 800. FIG. 9 and FIG. 11 depict a golf ball 1000 in the golf ball holder 800 with a side view and front view respectively. FIG. 10 and FIG. 12 depict the mount/base assembly 100 of the first embodiment in the golf ball holder 800 with a side view and front view respectively. These views depict portions of the golf ball holder 800 as transparent in order to illustrate the internal position of the golf ball 1000 and BA 100. This type of golf ball holder is essentially a vertical cylinder with an open slot in the front, and is installed in some models of the E-Z-GO golf cart. As illustrated in FIGS. 9 and 11, when the golf ball 1000 is inserted into the golf ball holder 800, it is kept in the golf ball holder by gravity. The open slot 810 in the front provides access for removing the golf ball 1000 vertically and allows a portion of the golf ball 1000 to protrude beyond the sides of the golf ball holder 800. The golf ball holder 800 provides a loose fit for the golf ball 1000 and provides no pitch, yaw or roll stability.

As illustrated in FIG. 10 and FIG. 12, when the mount/base assembly (BA) 100 of the first embodiment is inserted into the golf ball holder 800, the BA truncated sphere 110 is positioned within the cylinder of the golf ball holder 800, with the BA rail 114 on the top surface of the base assembly pressing into the sides of the open slot 810 of the golf ball holder 800. The BA rail 114 tightens the fit of the BA in the golf ball holder providing additional gripping force, and also provides yaw stability. The top surface of the BA presses against the front of the golf ball holder 800, providing pitch and roll stability. In this type of golf ball holder, the BA is in a vertical position. The accessory holder system rod 400 and accessory platform 500 depicted in FIG. 1 are rotated to position a PED at a suitable viewing angle for a golfer and fixed in position by tightening the ball cap 200. Other embodiments may use a flexible goose neck rod which can be bent into a desired position.

Additional Embodiments

FIG. 1 and FIG. 2 illustrate a first embodiment using a solid rod 400 and ball joint 300. An additional embodiment replaces these with a flexible goose neck rod. The flexible goose neck rod can be bent into a desired position for viewing and/or access of a personal electronic device (PED) or other article. The first embodiment also uses a platform 500 for attaching an accessory device. An additional embodiment modifies the platform to include sliding walls, which may operate with a spring and ratchet mechanism for griping an accessory device securely.

Figure 15:
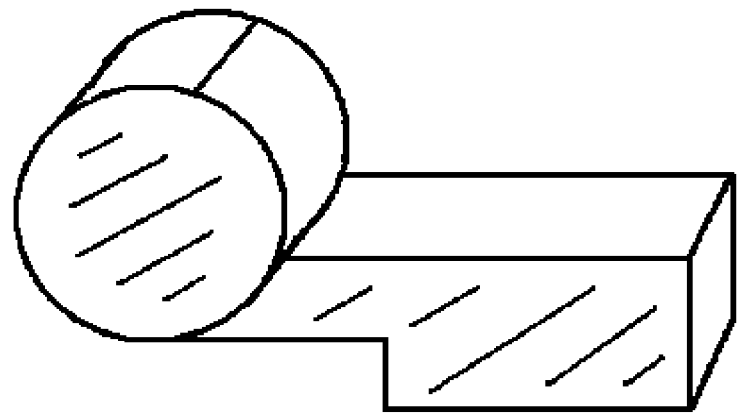
FIG. 15 shows an alternative embodiment of a mount/base assembly with cylinder
Figure 16:
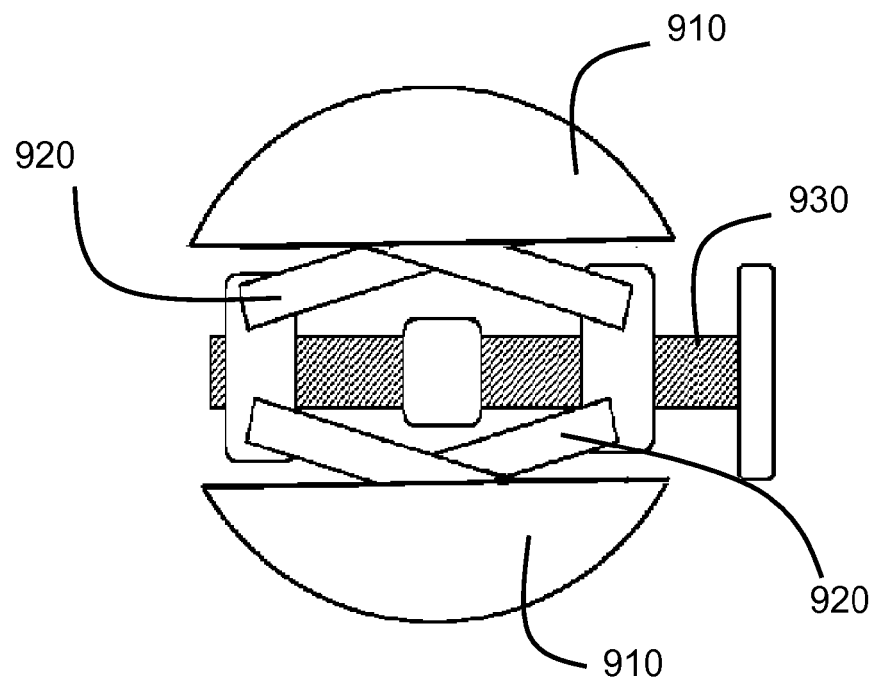
FIG. 16 shows an alternative embodiment of a mount/base assembly with jaws

The first embodiment uses a truncated sphere 110 as part of the mount/base assembly. An additional embodiment can use a different shape, such as a segment of a cylinder with the radius of a golf ball in one dimension and the width of a golf ball in another dimension as illustrated in FIG. 15. An additional embodiment of a mount/base assembly illustrated in FIG. 16, can create a set of jaws 910 and attach them to a selective means for moving the jaws 910, such as a scissors type lever 920 arrangement with a screw drive 930 mechanism. The jaws 910 are then opened to press into the golf ball holder to provide additional force for securing the base assembly.

Figure 13:
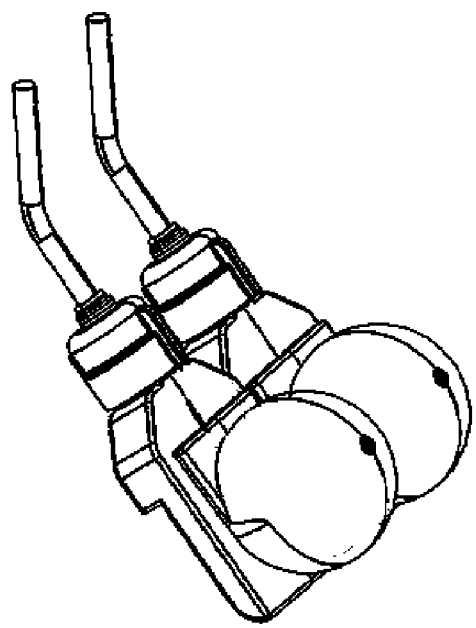
FIG. 13 shows an alternative embodiment with dual base assembly
Figure 14:
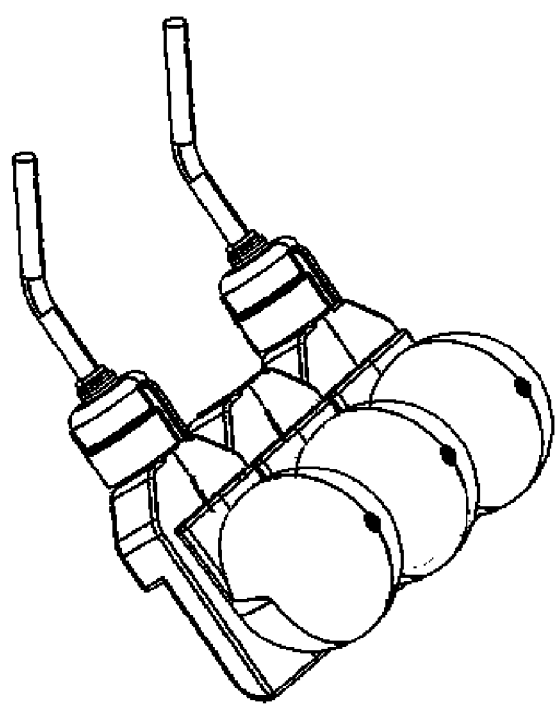
FIG. 14 shows an alternative embodiment with triple base assembly

FIG. 13 illustrates an alternate embodiment where the mount/base assembly 100 has been enlarged to include two truncated spheres and two rods for attaching a larger or heavier PED or other article. An alternative embodiment can use an alternate shape such as a cylinder. This embodiment of the base assembly can be inserted into a golf ball holder with at least two ball positions available. Many golf carts have several holders, each of which accommodate three golf balls. FIG. 14 illustrates an alternative embodiment where the base assembly has been enlarged to include three truncated spheres and two rods. An alternative embodiment can use an alternate shape such as a cylinder. This alternative can accommodate even larger or heavier PED's or other articles which may include multiple accessories, such as an IPOD with speakers. This embodiment of the base assembly can be inserted into a golf ball holder with three ball positions available.

Advantages

A first embodiment of the accessory holder system employs a mount/base assembly which is the width of a golf ball. Therefore only one position in a golf ball holder is required for mounting the accessory holder. Golf ball holders are located in a golf cart in positions which are readily accessible and viewable by a golfer. Therefore a personal electronic device or article attached to the accessory holder is also readily accessible and viewable by a golfer. When the accessory holder is mounted, it does not impede adjustment of a windshield, or interfere with access to beverages and other items placed in a cup holder. Since it does not require a cup holder for mounting, all of the cup holders are available for beverages and other items. The features of the base assembly combine to provide a stable platform for holding personal electronic devices or other articles when inserted into a variety of golf ball holder designs. A first embodiment of the accessory holder system is quite small and can easily be stored in a golf bag along with all of the other equipment that a golfer has stored. The base assembly itself is similar to the combined size of two golf balls. The first embodiment of the mount/base assembly is quite simple and has no moving parts. The accessory holder system is easily expanded to accommodate larger and/or heavier personal electronic devices and articles as illustrated in the alternate embodiments of FIGS. 7 A&B. Golfers may have an affinity to this accessory holder since the base employs a truncated sphere that resembles a golf ball, and can be inserted into a golf ball holder just like a golf ball. The sphere can also have a logo of popular golf ball manufacturers, e.g. Titleist, Callaway, etc., placed on it to enhance the resemblance to a golf ball.

Conclusions, Ramifications, and Scope

The details of a design have been described and illustrated to provide a novel and unique concept for mounting a personal electronics device or other article in a golf cart inserted into a golf ball holder. Features of a mount/base assembly have been designed to produce a stable accessory holder system in a variety of golf ball holders and maintain an accessory in a substantially secure and constant position during use. A truncated sphere is used in a first embodiment due to its resemblance to a golf ball, universal fit to a golf ball holder, the potential for licensing the application of logos, and the potential affinity for golfers.

Some accessories envisioned to be used with an accessory holder include, but are not limited to: a global positioning system device, a cell phone, an ipod or other music device with or without auxiliary speakers, and an ipad or other tablet computer.

The detailed description and specific examples given are by way of illustration and not of limitation. Changes and modifications may be made within the scope of the present invention without departing from the spirit thereof, and the invention includes all such modifications.

We claim:

1. An accessory holder system for mounting to a golf ball holder disposed in a golf cart, said golf ball holder being located in or under the dashboard of said golf cart and being configured with a cavity composed of a cylindrical or spherical section, which accepts a regulation size golf ball and having an internal configuration to hold said golf ball in place; said accessory holder system comprising:

an accessory holder that can selectively hold and adjust the viewing angle of an accessory device whereby information displayed on said accessory device can be easily viewed by a golfer seated in said golf cart; and a means for displacing said accessory device away from interference by features of the golf ball holder or the golf cart dashboard whereby the adjustment of said accessory device viewing angle is not substantially impeded; and a mount attached to said accessory holder comprised of a truncated sphere with the diameter of a regulation golf ball attached to a base structure whereby said mount is removably attached to said golf ball holder and wherein said base structure includes a shelf feature to impede rotation, a flat bottom surface which impedes rotation, and a rail which impedes rotation whereby said accessory device is maintained in a substantially secure, constant, and non-rotating position during use and wherein viewing of information displayed on said accessory device is not substantially impeded.

2. The accessory holder system of claim 1 wherein said accessory holder is comprised of a rectangular plate with a slot on either end wherein a button on said accessory device can be inserted and whereby said accessory device display can easily be viewed when said mount is inserted into said golf ball holder in either a vertical or horizontal position.

3. The accessory holder system of claim 1 wherein said means for displacing said accessory device from interference by features of the golf ball holder or the golf cart dashboard is composed of a rod attached to said accessory holder on one end and attached to said mount on the other end.

4. The accessory holder system of claim 3 wherein said rod is selected from the group consisting of solid rods and flexible goose-neck rods.

* * * * *